N. A. CHRISTENSEN.
PISTON
APPLICATION FILED JUNE 1, 1909.
988,311.
Patented Apr. 4, 1911.
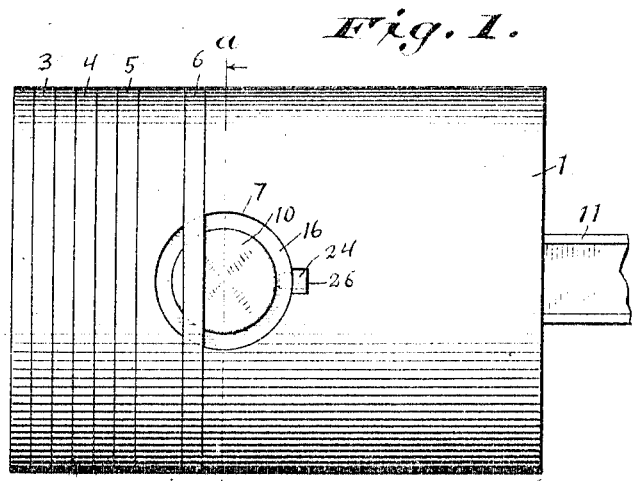
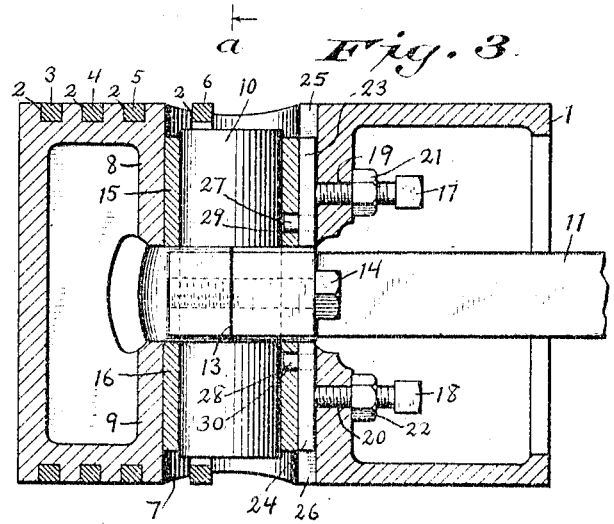
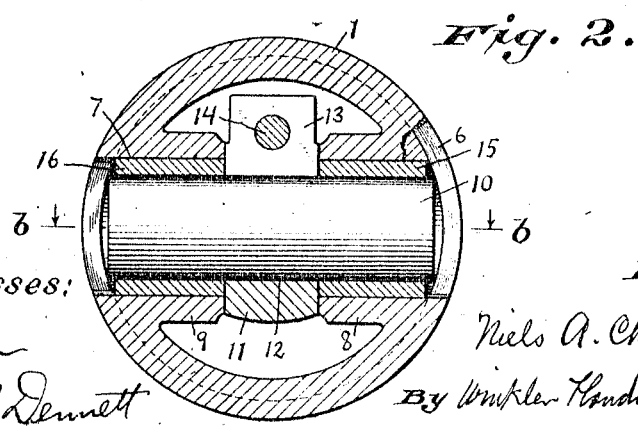
Witnesses:
Fred Palm
Frank E. Dennett
Inventor:
Niels A. Christensen
By Winkler Flanders Bottum
Attorneys.

UNITED STATES PATENT OFFICE.

NIELS A. CHRISTENSEN, OF MILWAUKEE, WISCONSIN.

PISTON.

88,311.   Specification of Letters Patent.   Patented Apr. 4, 1911.

Application filed June 1, 1909. Serial No. 499,305.

*To all whom it may concern:*

Be it known that I, NIELS A. CHRISTENSEN, a citizen of the United States, residing at Milwaukee, in the county of Milwaukee and State of Wisconsin, have invented certain new and useful Improvements in Pistons, of which the following is a specification, reference being had to the accompanying drawing, forming a part thereof.

My invention relates to pistons of that type which are provided with a transverse bore, within which is located a pin, to which pin a connecting rod is secured, and my invention provides specifically for utilizing one or more of the packing rings of the piston to prevent the pin and its bushings from contacting with the interior of a cylinder should the pin or bushings become displaced axially or should the pin be broken.

My invention further provides means for taking up the slack caused by the wear of bushings interposed between the bore in the piston and the pin.

Referring to the drawings which accompany this specification and form a part thereof, and on which drawings the same reference characters are used to designate the same elements wherever they may appear in each of the several views, Figure 1 is an elevation of a piston embodying my invention; Fig. 2 is a vertical section on the line $a$—$a$, Fig. 1, looking in the direction indicated by the arrows; Fig. 3 is a horizontal section taken on the line $b$—$b$ of Fig. 2, looking in the direction indicated by the arrows.

Referring specifically to the drawings, the numeral 1 designates the piston, which may be of any ordinary or preferred type. The piston is provided with recesses 2, within which are received the packing rings 3, 4, 5 and 6, and the piston is provided with a transverse bore 7, extending through the piston and the projections 8 and 9 located within the interior of the piston. Within this bore the pin 10 is adapted to be received.

The connecting rod 11 is provided with an aperture 12, within which the pin 10 is adapted to be received, and the connecting rod is split or sawed on one side of this aperture, as indicated by the numeral 13, and a bolt 14 is provided to draw the parts together so as to clamp the pin 10 tightly in the aperture 12. The projections 8 and 9, within the piston are separated by a distance slightly in excess of the width of the connecting rod, so that there will be no excessive play of the pin transversely of the piston, as clearly shown by Figs. 2 and 3 of the drawings.

The pin 10 is made of less length than the diameter of the piston by an amount equal to the depths of the recesses 2, or more, as clearly shown by Figs. 2 and 3 of the drawings, and bushings 15 and 16 are provided which are intended to be seated within the bore in the piston surrounding the pin. The recess 2 within which is seated the packing ring 6, for example, is so disposed with respect to the bore of the piston that when the packing ring 6 is in position in its groove 2, it lies across the bore and is opposite the ends of the pin 10, and when the piston is placed in a cylinder, this packing ring 6 is interposed between the pin 10 and the wall of the cylinder, so that the ends of the pin 10 cannot touch the wall of the cylinder should the pin 10 become loosened from the connecting rod 11 and move lengthwise in the bore, and so that neither end of the pin 10 can contact with the wall of the cylinder if the pin 10 should be broken and a part thereof tend to move outwardly in the bore.

In order to take up the slack or looseness of the bushings 15 and 16, which are tubes, caused by the wear of the pin 10 therein, compression means, such for example as the bolts 17 and 18, are provided, which are screwthreaded into screwthreaded recesses 19 and 20 in the projections 8 and 9 respectively, and these bolts are preferably provided with lock nuts 21 and 22 to prevent the bolts from unscrewing.

In order to distribute the pressure occasioned by bolts 17 and 18 over the length of the bushings 15 and 16, so as to compress said bushings, keys 23 and 24 are provided which are preferably made from steel or other hard material. These keys 23 and 24 are seated in recesses 25 and 26 formed in the side of the bore so as to keep them positioned in alinement with the ends of the bolts 17 and 18. In order to prevent the keys 23 and 24 from becoming displaced lengthwise of the bore and so contacting with the wall of the cylinder, they are provided respectively with pins or projections 27 and 28, which seat in recesses 29 and 30 provided in the bushings 15 and 16.

By reference to Figs. 2 and 3 of the drawings, it will be seen that the packing ring 6 not only prevents the pin 10 from contacting with the wall of the cylinder, but it also prevents either the bushing 15 or 16 from becoming displaced lengthwise of the bore and so contacting with the wall of the cylinder.

What I claim is:

1. The combination with a piston provided with a bore extending therethrough and with a packing-ring recess on the exterior thereof the continuity of which is interrupted by said bore, of a packing-ring located in said recess and extending over said bore, and a pin in said bore of less length than the diameter of said packing-ring and freely oscillatable within said bore.

2. The combination with a piston provided with a bore extending therethrough and with a packing-ring recess on the exterior thereof the continuity of which is interrupted by said bore, of a packing-ring located in said recess and extending over said bore, a pin in said bore of less length than the diameter of said packing-ring, tubular bushings located within said bore and surrounding said pin, and means to compress the material from which said tubular bushings are made to take up the slack caused by the wear of the pin.

3. The combination with a piston provided with a bore extending therethrough and with a packing-ring recess on the exterior thereof the continuity of which is interrupted by said bore, of a packing-ring located in said recess and extending over said bore, a connecting rod, and a pin clamped to said connecting rod and located in said bore, said pin being of less length than the diameter of said packing-ring.

4. The combination with a piston provided with a bore extending therethrough and with a packing-ring recess on the exterior thereof the continuity of which is interrupted by said bore, said bore being provided with recesses in the side thereof, of a packing-ring located in said packing-ring recess and extending over said bore, a pin in said bore of less length than the diameter of said packing-ring, tubular bushings located within said bore and surrounding said pin, keys in the recesses in the side of said bore to distribute pressure over the lengths of said bushings, and means to apply pressure to said keys to compress the material from which said tubular bushings are made to take up the slack caused by the wear of the pin.

5. The combination with a piston provided with a bore extending therethrough and with a packing-ring recess on the exterior thereof the continuity of which is interrupted by said bore, said bore being provided with recesses in the side thereof, of a packing-ring located in said packing-ring recess and extending over said bore, a pin in said bore of less length than the diameter of said packing-ring, tubular bushings located within said bore and surrounding said pin, said bushings being provided with recesses, keys in the recesses in the side of said bore provided with projections adapted to be received in the recesses in said bushings, and bolts to force said keys against said tubular bushings to compress the material thereof to take up the slack caused by the wear of the pin.

In witness whereof I hereto affix my signature in presence of two witnesses.

NIELS A. CHRISTENSEN.

Witnesses:
 CHAS. L. GOSS,
 FRANK E. DENNETT.